United States Patent Office 2,720,828
Patented Oct. 18, 1955

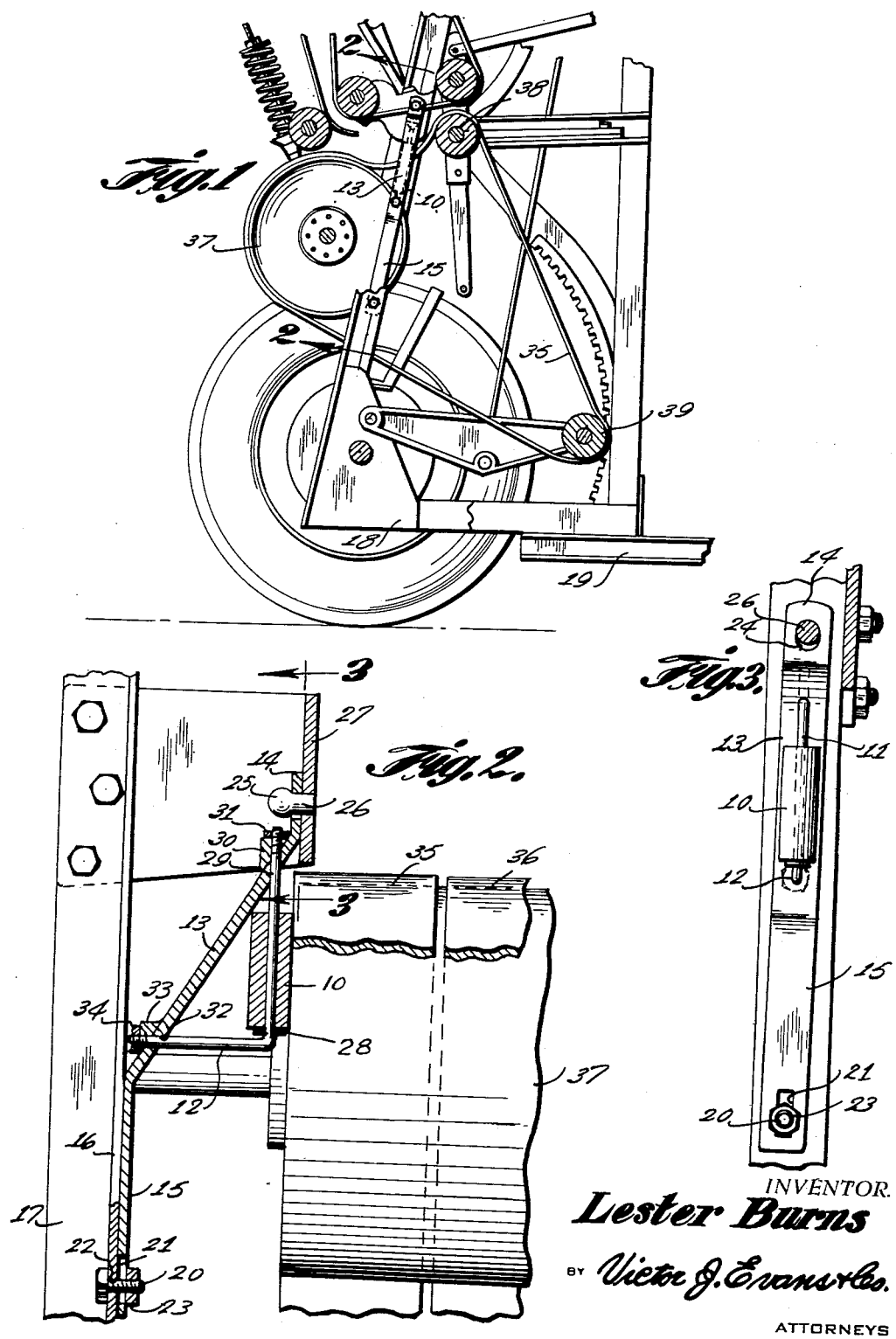

2,720,828

ROTARY BALER BAND GUIDE

Lester Burns, Ridgeway, Mo.

Application June 25, 1954, Serial No. 439,274

4 Claims. (Cl. 100—88)

This invention relates to a machine for compressing substances such as cotton, straw, corn stalks, hay and the like, particularly of the rotary type where the substances are compressed between bands mounted on yielding pulleys, and in particular, vertically positioned rollers mounted on brackets attached to the frame of a rotary baler and positioned to engage the edges of end bands of the baler whereby the bands are retained in operative positions upon the pulleys, continuously.

This invention is an improvement in rotary balers of the type shown in Patents 2,336,491 and 2,096,990, and the attachment is adapted to be mounted with the lower end attached to the frame 20 of Patent No. 2,096,990 with the upper end connected to a stud on the end guide of the drive roll support whereby the roller is positioned to be engaged by the edge of the end belt on each side of the machine.

The purpose of this invention is to prevent the end or outside bands on both sides of a rotary baler from coming off of the drum, particularly when a conical bale is made which causes uneven driving and looseness of the band on one side or the other whereby a band catches or locks and, in some instances, damaging or breaking the bands.

In a rotary baler, particularly as shown in the above-identified patents, the intermediate bands are retained in their respective positions with the band separators, however, the outside or end bands are free to slip from the ends of the pulleys, causing the machine to clog, or break a band and, in numerous instances, causing accidents. In the above-identified patents, comparatively small end guides are provided for this purpose, however, these guides are relatively short and do not solve the problem. With this thought in mind, this invention contemplates attaching brackets to the end guides and frame at the sides of a rotary baler whereby vertically disposed rollers rotatably mounted on the brackets are positioned to engage edges of the end bands continuously so that the bands are retained in operative position on the ends of the pulleys.

The object of this invention is, therefore, to provide means for mounting vertically disposed rollers on frame members at the side of a rotary baler whereby the rollers are substantially in continuous contact with edges of end bands of the machine so that the bands will be retained in operative position on the pulleys.

Another object of the invention is to provide an attachment having a vertically disposed roller therein in which the attachment is adapted to be mounted on both sides of the frame of a rotary baler of the type now in use without changing parts of the frame of the baler.

A further object of the invention is to provide an attachment adapted to be mounted on side frames of a rotary baler for retaining end bands in position on pulleys of the baler in which the attachment is of a simple and economical construction.

With these and other objects and advantages in view, the invention embodies an attachment having flanges at the ends of a diagonally disposed intermediate section with a roller rotatably mounted on a vertical section of an L-shaped rod secured on the diagonally disposed intermediate section of the bracket and wherein the lower end of the bracket is adapted to be attached to a side frame member of a rotary baler with the upper end mounted on a stud of an end guide of the baler.

Other features and advantages of the invention will appear from the following description taken in connection with the drawings, wherein:

Figure 1 is a longitudinal section through a portion of a rotary baler showing the relative positions of belts for forming a cylindrical bale and illustrating the position of the attachment or bracket of this invention, part of a side frame member of the machine being broken away to show the bracket.

Figure 2 is a cross section through a portion of the baler taken on line 2—2 of Figure 1 illustrating the mounting of the attachment or bracket of this invention, the parts being shown on an enlarged scale.

Figure 3 is a detail showing a section taken on line 3—3 of Figure 2, illustrating the mounting elements of the bracket.

Referring now to the drawings wherein like reference characters denote corresponding parts, the improved band guide of this invention includes a roller 10 rotatably mounted on a vertical section 11 of an L-shaped rod having a lower horizontally disposed section 12, a diagonally positioned bar 13 in which the L-shaped rod is mounted, a flange 14 extended from the upper end of the section 13 of the bar and a vertically disposed portion 15 extended from the lower end of the section 13 and secured to a flange 16 of a side member 17 of a frame 18 of a baler, as indicated by the numeral 19, by bolt 20.

The bracket of this invention includes a flat bar bent to form the diagonally disposed intermediate section 13, the flange 14 at the upper end and the straight section 15 extended from the lower end and, as illustrated in Figure 2, the portion 15 is provided with an elongated slot 21 that is positioned to register with an opening 22 in the flange 16 whereby the bolt 20, positioned in the opening 22, extends through the slot 21. The end of the bolt or stud is provided with a nut 23 by which the bracket is secured in position. The flange 14 at the upper end of the bracket is provided with an enlarged opening 24 that is adapted to pass over an enlargement or ball 25 on a stud 26 mounted in the conventional end guide 27 which extends from a frame member at each side of the machine.

The vertical section 11 of the L-shaped rod is provided with a collar 28 that forms a seat for the roller 10 and, also as shown in Figure 2, the upper end of the rod extends through an opening 29 in the bracket and also through a lug 30 secured, such as by welding, to the section 13 of the bracket. A nut 31 is provided on the upper threaded end of the section 11 for securing the rod in position.

The lower horizontally disposed section 12 of the rod extends through an opening 32 in the section 13 of the bracket and also through a lug 33 welded to the outer surface of the section 13 and the extended end of the rod, which is threaded, is provided with a nut 34.

With the parts formed and assembled, particularly as shown in Figures 2 and 3, a bracket is mounted on each side of a rotary baler whereby the roller 10 is positioned to be engaged by the outer edge of the end band 35 at each side of the machine, the band 35 and the intermediate bands 36 being trained over pulleys 37, 38 and 39.

The attachment disclosed and described is particularly adapted for use on a rotary baler as illustrated in Patent No. 2,096,990, and it will be understood that parts of the bracket are adapted to be modified to correspond with different machines and particularly rotary balers of different manufacturers.

It will be understood that other modifications may be made in the design and arrangement of the parts, such as come within the scope of the appended claims, without departing from the spirit of the invention.

What is claimed is:

1. An attachment for a rotary baler of the type having side frames with end guides extended inwardly therefrom comprising a diagonally disposed bar having a flange with an opening therethrough on the upper end and a straight portion with a slotted opening therein extended from the lower end, said flange and straight portion of the bar being in spaced parallel planes, said bar adapted to be positioned with the flange at the upper end against the inner surface of an end guide on one side of the baler and with the straight portion extended from the lower end positioned against the frame at the side of the baler and spaced outwardly from said guide, an L-shaped rod mounted in said diagonally disposed bar and positioned to provide a vertically disposed section the upper end of which extends through the upper end of the bar and a horizontally disposed section the extended end of which extends through the lower portion of the bar, and a roller rotatably mounted on the vertically disposed section of the rod and positioned between the horizontally disposed section and upper end of the bar.

2. An attachment for a rotary baler of the type having side frames with end guides extended inwardly therefrom and having endless end bands and endless intermediate bands trained around pulleys therein, comprising a diagonally disposed bar having a flange with an opening therethrough on the upper end thereof and a straight portion with a slotted opening therein extended from the lower end thereof, said bar adapted to be positioned with the flange at the upper end against the inner surface of an end guide on one side of the machine and with the straight portion extended from the lower end positioned against a side frame member at the side of the machine, an L-shaped rod mounted in said diagonally disposed bar and positioned to provide a vertically disposed section and a horizontally disposed section, and a roller rotatably mounted on the vertically disposed section of the rod, said end guide having a stud extended therefrom and the flange at the upper end of the diagonally disposed section of the bar being positioned with the stud extended through said opening at the upper end therein, whereby the roller on the vertically disposed section of the rod carried by the bar is positioned to be engaged by an edge of a band of the baler.

3. In an attachment for use on a rotary baler having a frame with side members with end guides extended inwardly from said side members and with end bands and intermediate bands trained over pulleys of the baler, the combination which comprises a bracket having a diagonally disposed bar with a flange having an opening therethrough extended from the upper end and a straight portion with an elongated slot therein extended from the lower end and having an L-shaped rod carried by the diagonally disposed section and positioned to provide a vertically positioned section and a horizontally disposed section, a roller rotatably mounted on the vertically positioned section of the rod, means for securing the upper end of the bracket to an end guide of the baler and means for securing the lower end of the bracket to a side member of the baler frame, said bracket being positioned whereby the roller mounted on the vertically disposed section of the L-shaped bar is positioned to be engaged by an edge of at least one of said end bands.

4. In an attachment, the combination which comprises a diagonally disposed bar having a flange with an opening therein extended from the upper end thereof and having a straight portion with a slotted opening therein extended from the lower end thereof, an L-shaped rod having threaded ends mounted with the ends extended through upper and lower portions of the diagonally disposed section of the bar and secured in position to provide a vertically disposed section and a horizontally disposed section with nuts on the threaded ends, and a roller rotatably mounted on the vertically disposed section of the rod, said bracket being adapted to be positioned with the lower end secured to the lower portion of a flange of a frame member of a rotary baler having end and intermediate baling bands trained over pulleys and the upper end positioned on a stud extended from an end guide at one side of the baler and whereby the roller on the vertically disposed section of the rod is positioned to be engaged by an edge of an end band.

References Cited in the file of this patent

UNITED STATES PATENTS

| | | |
|---|---|---|
| 360,992 | Brown | Apr. 12, 1887 |
| 613,956 | Anderson | Nov. 8, 1898 |
| 2,096,990 | Luebben | Oct. 26, 1937 |
| 2,124,422 | Klein et al. | July 19, 1938 |